Nov. 25, 1969   J. McMURRAY CARPENTER III, ETAL   3,480,706
SPINNING FIBER-FORMING LINEAR CONDENSATION POLYMER
Filed Oct. 10, 1968                                           2 Sheets-Sheet 1

INVENTORS
JOHN McMURRAY CARPENTER III
DREXEL KERMIT SMITH

BY E. Leigh Hunt
ATTORNEY

Nov. 25, 1969  J. McMURRAY CARPENTER III, ETAL  3,480,706
SPINNING FIBER-FORMING LINEAR CONDENSATION POLYMER
Filed Oct. 10, 1968  2 Sheets-Sheet 2
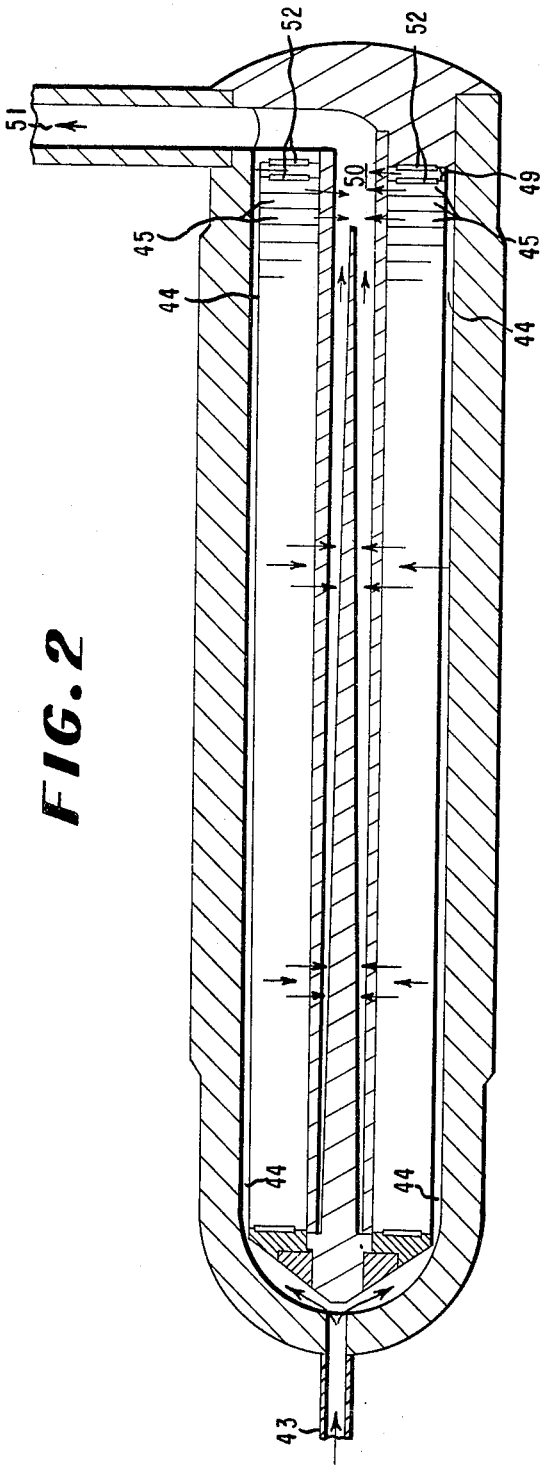
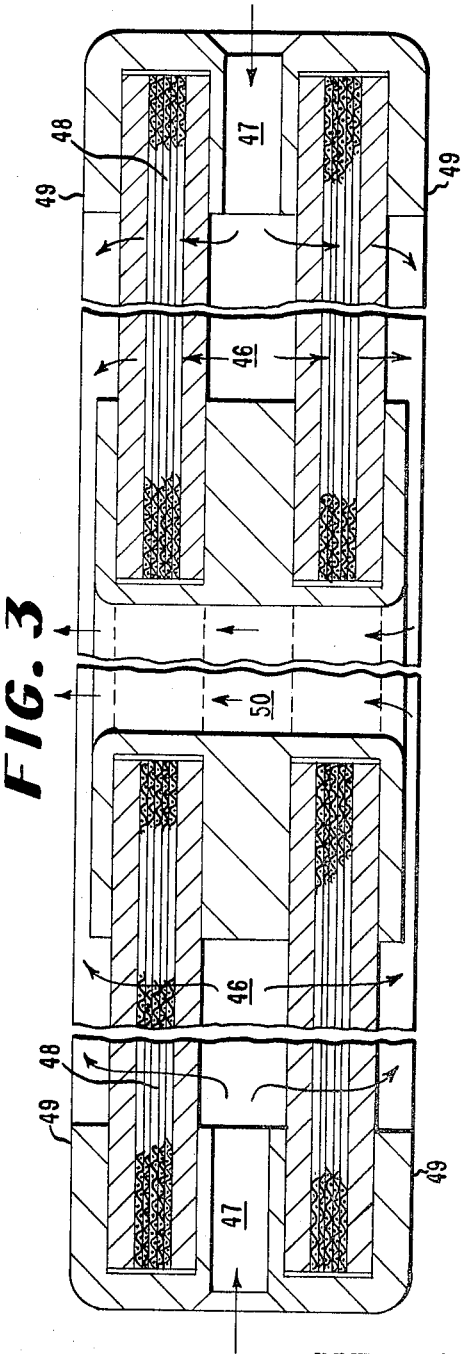
INVENTORS
JOHN McMURRAY CARPENTER III
DREXEL KERMIT SMITH
BY  E. Leigh Hunt
ATTORNEY

United States Patent Office 3,480,706
Patented Nov. 25, 1969

3,480,706
SPINNING FIBER-FORMING LINEAR
CONDENSATION POLYMER
John McMurray Carpenter III, Kinston, N.C., and
Drexel Kermit Smith, Richmond, Va., assignors to
E. I. du Pont de Nemours and Company, Wilmington, Del., a corporation of Delaware
Continuation-in-part of application Ser. No. 670,052,
Sept. 25, 1967. This application Oct. 10, 1968, Ser.
No. 767,064
Int. Cl. D01d 1/10
U.S. Cl. 264—176                    7 Claims

ABSTRACT OF THE DISCLOSURE

An improvement in the production of synthetic textile filaments of fiber-forming linear condensation polymer that provides better filament continuity and a longer spinneret pack life, the improvement including the step of pumping the polymer at a high pressure in excess of 1,000 pounds per square inch gage through a low pressure drop filter having a pressure drop of 200 to 800 p.s.i. to filter the polymer, the filtering being done prior to meter-pumping the polymer through the spinneret pack for melt-spinning.

REFERENCES TO RELATED APPLICATIONS

This application is a continuation-in-part of our application Ser. No. 670,052, filed Sept. 25, 1967 and now abandoned.

BACKGROUND OF THE INVENTION

Field of the invention

This invention relates to the filtration of molten polymers and more particularly to an improved filtration process for producing uniform shaped structures.

Description of the prior art

Filtration of molten polymers is known to the art and is disclosed in such prior patents as British Patent No. 801,813 (assigned to the present asisgnee), published Sept. 24, 1958; and McCormich U.S. Patent No. 3,028,-627, dated Apr. 10, 1962. When molten polymer is filtered, agglomerated additives, solid polymer gel and the like are removed and the resultant filtered material is thus rendered more suitable for the production of shaped structures. The production of shaped structures, such as filaments, requires removal of particulate matter that would otherwise clog the exceedingly small spinning orifices. Further, any source of nonhomogeneity should be removed so as to reduce accompanying variation in the properties of the filaments.

In producing multifilament yarns it is particularly important that the filaments comprising the yarn be as uniform as possible. If, for instance, the yarn contains filaments that vary appreciably in denier or contain segments of markedly different viscosity, subsequent drawing of the parn will cause objectionable filament breakage.

SUMMARY OF THE INVENTION

This invention provides in its broadest aspect an improved process for the production of synthetic polymeric multifilament yarns comprising passing molten polymer through a transfer-line filter having a low pressure drop (relatively low flow rate per unit filter area), maintaining the polymer in a molten condition as it moves through a plurality of passages, metering the molten polymer and forcing it through a spinneret pack filter having a high pressure drop and thereafter shaping the polymer.

In its narrower aspect the invention is an improvement in a process for the production of synthetic filaments which comprises polymerizing prepolymer material in a reactor to form molten fiber-forming synthetic linear condensation polymer, maintaining the polymer in a molten state at a temperature above about 175° C., forwarding the polymer through a transfer-line to a positive displacement metering pump, pumping the polymer with the pump at substantially constant rate at a gage pressure within the range of about 1500 to 6000 pounds per square inch through a spinning pack comprising a filter medium and a spinneret to extrude the polymer into a quenching chamber maintained at substantially atmospheric pressure, and then qenching the extruded polymer to form the filaments; the method for improving filament continuity and pack life wherein the improvement comprises increasing the pressure of the polymer in the transfer-line to a pressure of greater than about 1000 pounds per square inch gage with a booster pump located between the reactor and the metering pump, and then filtering the polymer at the increased pressure with a transfer-line filter before reaching the metering pump, said transfer-line filter having a pressure drop within the range of about 200 to about 800 pounds per square inch. In any event, the pressure within the transfer-line must be increased to a level that will provide at least 100 p.s.i. gage pressure to all metering pumps to prevent metering pump inlet starvation. The invention is particularly applicable to fiber-forming polymer of polyamides and polyesters.

DESCRIPTION OF THE DRAWING

The drawing is a diagrammatic sketch of an embodiment of the invention useful in a continuous process.

Turning now to the drawing, molten polymer in polymer finisher or screw melter 1 is passed to screw pump 3 which forwards the polymer towards booster pump 7 and shear-filter devices 21 and 21' (transfer-line filters) located in transfer-line 5. Booster pump 7, run by motor 9, forwards the polymer through a downstream section of transfer-line 5 to either of shear-filter devices 21 or 21'. When valves 15 and 23 are open and valves 15' and 23' are closed, the polymer will pass through auxiliary line 13 and be filtered in device 21. When it is desired to replace device 21, valves 15 and 23 are closed and valves 15' and 23' are opened to pass the polymer through auxiliary line 13' and device 21'. Flanges 17 and 19, provided for the purpose, are broken, and new device 21 inserted and the flanges resealed. Flanges 17' and 19' are provided for changing device 21' in like manner. On leaving device 21, the polymer passes to the downstream junction of auxiliary lines 13 and 13' where they unite to continue as transfer-line 5. On passing through transfer-line 5, the polymer travels through header 27 which serves to distribute the polymer to individual conduits such as at 29 and 31 which serve as the supply source of molten polymer for spinning. In spinning, the polymer passes through meter pump 33 in a precise amount and is filtered as it passes through filter 35 and is extruded as small precise streams from a multiplicity of orifices in spinneret 37 and is then quenched in chamber 42 to form the filaments. The filter agent and the spinneret are usually combined and the assembly referred to as a pack. The filaments are converged at guide 39 to form yarn 41. Excess polymer may be diverted as shown by the dotted lines at 4, if desired, to duplicate facilities to those described above.

FIG. 2 illustrates an embodiment of a transfer-line filter assembly as used in Example 1 whereas FIGURE 3 represents an enlarged view of the filter elements of FIG. 2. Referring to FIGS. 2 and 3, polymer enters the filter assembly through inlet 43 and fills the annular space 44 between the filter elements 45 and the interior of the filter assembly wall. The polymer flows into the central portion of the annular space 46 of the dual element filter through a number of holes 47 into the interior space from the periphery of the filter, the holes being spaced radially outwardly around the filter element. The filter elements of FIG. 3 are arranged within FIG. 2 as illustrated. The longitudinal axis of the filter assembly corresponds to the central axis of the dual-type ring filter elements. The filter elements are stacked along the axis of the assembly with the outer periphery 49 of consecutive filter elements forming a fluid tight seal. A screen type spacer 52 is used to keep the screens of consecutive filters spaced apart so that the filtered polymer may flow inward towards the central longitudinal channel of the filter assembly. The polymer flows from the interior 46 of the dual filter elements in opposite directions through the dual stacks of screens (see Example I) into the channel defined by the space between the consecutive filter elements (and held open by a spacer ring) and into the central portion 50 of the filter assembly and then exists through outlet 51.

Figure 1:
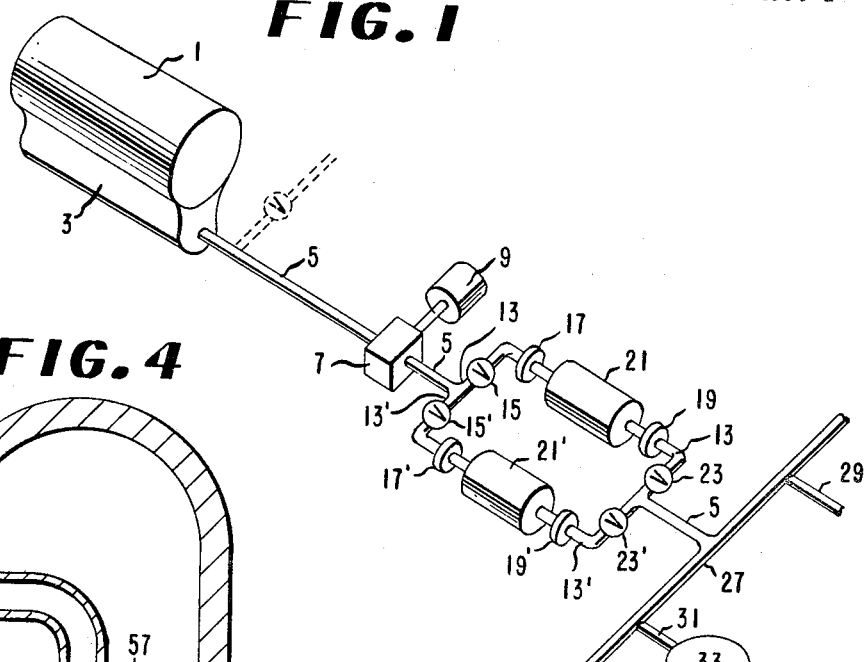
Figure 4:
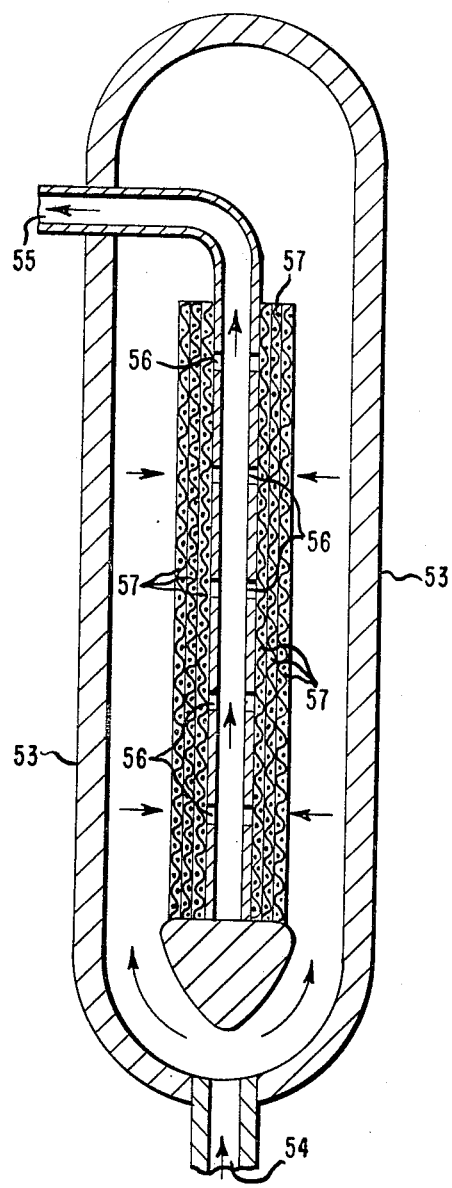

FIGURE 4 represents another embodiment of a filter assembly useful in the practice of this invention. In this embodiment the assembly comprises an outer shell 53 having inlet 54 and outlet 55. A pipe having a plurality of holes 56 which are positioned radially around the circumference and along the length extending into the interior of the pipe. The pipe is mounted concentrically within the interior of the shell. The end of the pipe adjacent the inlet is closed and the other end passes through the shell outlet and forming a fluid tight seal therewith. The pipe is wrapped with layers of various screens 57 to provide the desired filtration (see Example II for a preferred embodiment). The polymer passes through the screens and into the interior of the pipe and then out of the assembly through the shell outlet.

DESCRIPTION OF PREFERRED EMBODIMENTS

The polymers useful in the practice of this invention are those synthetic polymers susceptible to thermal changes, particularly synthetic linear condensation polymers formed by the elimination of a low molecular weight by-product. As is well known, the manufacture of synthetic condensation polymers, e.g., polyesters and polyamides, does not produce a completely uniform product. In any given molten polymer product, some portions of the material will have a different thermal history than other portions due to different exposure times to heat-exchange surfaces, stagnant areas and the like. Differences in thermal history lead to different degrees of condensation and even to gel formation from polymer degradation where the length of time the polymer is exposed to the heat-exchange surface is excessive. Nonuniformity of the product due to differences in its thermal history may be evident from differences in dye-ability, viscosity, filament denier, drawability and the like. As a consequence of this nonuniformity, it is desirable to treat the polymer in such a fashion that the most uniform polymer possible issues from the spinneret. Nonuniformity is most evident from the yarn break level during drawing. Such breaks, obviously, are highly undesirable and costly as they occur in a high speed process.

The surprising discovery has now been made that a continuous process for producing and spinning condensation polymers into filaments provides more uniform filaments when the molten polymer while under an increased pressure is passed through a transfer-line filter across which there is a relatively low pressure drop and subsequently passing the filtered polymer through a second filter across which the pressure drop is at least about 2 times and may be about 50 times as great.

While not wishing to be held thereto, it is believed that the following can explain, at least in part, the unexpected results achieved by the practice of this invention. In the continuous production of molten polyester polymer and its movement to spinning units through a plurality of transport lines, it is believed that the formation of nonuniformities occurs throughout the system, but that the majority of such formation occurs prior to the molten polymer being distributed by the transport lines.

A portion of the nonuniformities is thought to be a viscous gelatinous material consisting of partially degraded polymer that lacks the extensive cross-linking characteristic of solid decomposition products or gel. When this gelatinous material contacts a filter across which there is a low pressure drop, the material is retained on the surface. However, where there is a high pressure drop, the degraded polymer is forced through the filter and the spinneret orifices. Since this partially degraded polymer will have different characteristics than the regular adjacent polymer, uniformity of the product will be lost.

Despite the important contribution of a transfer-line filter having a low pressure drop, the commonly employed high-pressure-drop filter used in the pack cannot be discarded. If there is no filter element in the pack, or if only a screen or such having suitable openings so as to provide a low pressure drop is used, performance deteriorates. Presumably, additional nonuniformities appear in the molten polymer from contacts with the heated transport lines as it passes along its designated route and these need to be removed in the filter having a high pressure drop. The filter in the pack is a preferred high-pressure drop filter. Space limitations at the pack location prevent the use of a filter device that can provide a low pressure drop and effective filtration, i.e., low filtration rate/unit area of effective filter surface.

In addition to providing a more uniform polymer for shaping into filaments, the practice of this invention has also been found to improve performance and uniformity by increasing the life of the pack and thus eliminating waste due to frequent pack changes. Further, the conditions in the pack have been found to be less variable and hence the overall performance of the spinning machine is more uniform.

The pressure drop achieved across a filter is dependent on several factors and these will need to be considered in selecting the filter to be used. When filtering polymer of a given viscosity at a given throughput through a filter of a given formulation, the pressure drop can be reduced by increasing the effective area of the filter media. However, for a particular polymer-filter geometry practical limitations, such as available space, cost and the length of time the polymer is in the filter, restrict the amount of filter area that can be provided. Consequently, the filter selected for any given circumstance can be expected to be the result of compromise with the intent of obtaining the maximum filtering area in a filter vessel of minimum volume.

Transfer-line filters operating under normal conditions will gradually lose their filtering ability with time as the material removed from the polymer accumulates. For example, a suitable filter having an initial pressure drop on the order of about 100 to about 375 pounds per square inch (7.0 to 26.3 kilograms per square centimeter) gage should be replaced with a new unit when the pressure drop approaches a level of about 1400 pounds per square inch (98.0 kilograms per square centimeter) gage. If the pressure drop level for this filter increases beyond this level, performance will begin to deteriorate and at high levels, e.g., 3,000 to 6,000 pounds per square inch (211 to 423 kilograms per square centimeter) gage, the primary advantages of this invention will be largely lost.

In order to maintain an adequate supply of molten polymer at all times for the meter pumps, the pressure in the lines between the outlet of the transfer-line and the intake of the meter pump is kept at a relatively high value and a pressure of about 2,000 to about 2,200 pounds per square inch (141 to 155 kilograms per square centimeter) gage will provide a useful result when, e.g. the polyester temperature is maintained at about 285° C. and the relative viscosity is about 26. If a change is made in the system, it may be necessary to change the pressure. For instance, if a higher viscosity polymer is used, the pressure will have to be increased accordingly in order to maintain the desired flow.

The pressure drop per unit of filter area across the filter in the pack is at least 2 times, normally 4–12 times and may be as high as 50 or more times greater than that of the transfer-line filter. Suitable pressure drops can range from about 1,500 to 6,000 pounds per square inch (59.3 to 423 kilograms per square centimeter) gage. At higher pressure drops, pack leakage and gel extrusion become problems and performance deteriorates.

Suitable filters for installation in the transfer-line will be known to those skilled in the art and will be of such general design as to minimize hold-up time and provide for stream-lined flow of the polymer. Preferably the filter will retain particulate matter of a size greater than about 10 microns and will have an effective filter area of at least 3.5 square inches (22.6 square centimeters) per pound (453.5 grams) per hour throughput.

The filtering elements used in the pack may be comprised of metal screens, layers of sand, porous metal plates or any combination thereof. The filter elements may all have the same size opening for passage of the molten polymer or there may be a graduation of opening size.

The polymer is maintained in a molten condition in the transport lines by heating them electrically, by jacketing them for heating with a hot fluid and the like. Preferably the transport-lines will be both jacketed and insulated to maintain the polymer at a temperature above its melting point at all times.

The polyesters will preferably have a relative viscosity of about 10 to about 70. The term "relative viscosity" refers to the ratio of the viscosity of a solution of a polyester to the viscosity of the solvent. Any of the suitable polyester solvents, such as phenols, chlorinated phenols and the fluorinated compounds disclosed in U.S. 3,245,944, e.g., hexafluoroisopropanol, may be used. A dilute solution, e.g., 3–15%, preferably 5–10%, by weight, is used in the determination. The ratio varies with the solvent, the concentration and the temperature and these need to be specified. As used herein, the term "polyester relative viscosity" refers to the ratio of the viscosity of a solution of 2.150 grams of the polyester in 20 ml. of a mixture of 10 parts of phenol and 7 parts of 2,4,6-tri-chlorophenol (by weight) having a density of 1.232 to the viscosity of the phenol tri-chlorophenol mixture, per se, measured in the same units at 25° C.

Polyamide relative viscosity is measured in a conventional manner at 25° C. using 3.7 grams of polymer in 50 ml. of a solvent consisting of a 1:1 weight ratio of 98–100% formic acid and phenol. The polyamide will preferably have a relative viscosity of about 20–300.

The operation and utility of the process of this invention will be apparent from the following examples.

EXAMPLE I

This example illustrates a preferred embodiment of the process and shows the improved results from the practice of this invention.

This example describes a test run on two positions of a spinning machine used in the standard production of a polyamide yarn. The polyamide is prepared from bis(4-aminocyclohexyl)methane containing 70% of the trans-trans isomer and dodecanedioic acid. All equipment and spinning processes used throughout the test period are as for regular production except that a light pack (74 microns) and a transfer-line filter is used during a portion of the test period as described below. Each position uses 4 spinning packs.

The polymer has a density of 0.92 gram/cm.$^3$ and a relative viscosity of about 48. The test consists of two parts. In the first part, the machine is run without the transfer-line filter to establish a performance base. After the transfer-line filter is installed, the machine is run again with all other conditions the same as the base process.

The booster pump is located between the screw pump (which withdraws polymer from the reactor vessel) and the transfer-line filter and is a one stream gear pump having a capacity of 20 cc. per revolution. The pressure is about 400 p.s.i. gage (29.2 kg./cm.$^2$) at the inlet and the discharge pressure is about 2040 p.s.i. (144.5 kg./cm.$^2$) gage at startup with the transfer-line filter in place. The discharge pressure without the filter is about 1800 p.s.i. (126.9 kg./cm.$^2$) gage at startup.

The transfer-line filter is of the low-pressure drop, screen type as illustrated in FIG. 2 (filter assembly) and 3 (filter elements) of the drawings. Fifty of the double filter elements as shown in FIG. 3 are utilized. Each element has two of the following stacks of filter screens which are made of Type 304 stainless steel, the first listed being the first to contact the polymer:

(1) 50 x 50 mesh, 0.009 in. wire dia.
(2) 200 x 200 mesh, 0.0023 in. wire dia.
(3) 325 x 325 mesh, 0.0014 in. wire dia.
(4) 17 microns (nominal) "Rigimesh"
(5) 200 x 200 mesh, 0.023 in. wire dia.
(6) 10 microns (nominal) "Rigimesh"
(7) 50 x 50 mesh, 0.009 in. wire dia.

The above low pressure drop transfer-line filter has a filter pressure drop of 240 p.s.i. (16.8 kg./cm.$^2$) when installed, a total effective filter area of 360 square inches (2323 cm.$^2$) and a throughput of 26 pounds (11.8 kg.) per hour. The filter pressure rise averages about 0.5 p.s.i. (0.035 kg./cm.$^2$) per hour during the period of test.

The standard spinneret pack is a heavy pack and has been found to be efficient in removing the undesirable substances from the polymer in the standard processing of the polyamide polymer used in the test. It has high filtering capability but its life is unacceptably short when the process is conducted witout the transfer-line filter in that the pressure buildup is too rapid.

The standard pack filter having the high pressure drop removes particles larger than 10 microns. In the pack, the ratio of filtration area to polymer throughput is 1.3 in.$^2$ lb.$^{-1}$ hr. Each pack has an effective filtration cross-sectional area of 3.2 square inches and there are two positions having four packs, each. The pack filter is of the type having a series of screens stacked to yield the desired pressure drop at startup. The spinning pack (pack filter and spinneret) has a pressure drop of about 1600 p.s.i. (113.8 kg./cm.$^2$) initially. The pressure drop increases to the maximum allowable of 6,000 p.s.i. (423 kg./cm.$^2$) in 48 hours without the transfer-line filter but requires 70 hours to reach the maximum pressure with the transfer-line filter in place.

The initial pressure drop across the pack filter only is about 650 p.s.i. (45.8 kg./cm.$^2$). Most of the increase in pack pressure is due to the filter elements and not the spinneret as the orifices retain substantially the same cross-sectional openings and resistance to flow. Whenever the multifilament yarn prepared from the polymer is drawn, the broken filament defects per million end yards (meters) are 1.8 (2.0) without the transfer-line filter and are reduced to 0.9 (1.0) with the filter in place.

The second position pack filters have screens of 74 micron openings as the fine screens. The same order of superiority of the transfer-line filter was exhibited over the process without the transfer-line filter when used with the 74 micron fine pack screens. However, the pack screens having the larger 74 micron openings yielded a lower quality level than the 10 micron screens in either case. The table below shows the various responses.

SUMMARY OF RESPONSES

| Spinning Pack | Position 1 | | Position 2 | |
|---|---|---|---|---|
| | Without TLF Filter | With TLF Filter | Without TLF Filter | With TLF Filter |
| Fine screen openings, micron | 10 | 10 | 74 | 74 |
| Starting pressure, p.s.i | 1,625 | 1,600 | 1,200 | 1,000 |
| Pressure rise: | | | | |
| 1st 15 hr., p.s.i | 35 | 7 | 0 | 0 |
| 2nd 15 hr | 66 | 28 | 0 | 0 |
| 3rd 15 hr | 103 | 41 | 0 | 0 |
| 4th 15 hr | | 67 | 0 | 0 |
| Time to reach 6,000 p.s.i. maximum, hr | 48 | 70 | ~70 | >104 |
| Machine Operation: | | | | |
| TL Filter Area/Total Pack Area | 14:1 | 14:1 | 14:1 | 14:1 |
| Pounds produced | 535 | 865 | 570 | 850 |
| Broken filament defects per million end yards | 1.8 | 0.9 | 13.3 | 6.0 |

EXAMPLE II

This example illustrates improved pack performance as a result of the practice of the invention.

Polyethylene terephthalate is polymerized to a relative viscosity of 26 in a polymer finisher, and the molten polymer, which is maintained at a temperature of 285° C., is pumped by means of a screw pump to the inlet of a one stream gear type booster pump. The booster pump has a capacity of 16.5 cc. per revolution and is capable of delivering 9 to 100 pounds (4–68 kg.) of the polymer per hour. The inlet pressure of the booster pump is about 500 p.s.i. (35.3 kg./cm.$^2$) gage and the outlet pressure ranges from about 2600 to 2700 p.s.i. during the test period.

The booster pump forces the molten polymer through a transfer-line filter of the type illustrated in FIG. 4 of the drawings. The filter comprises a shell having an inlet and an outlet and a pipe of 3.5 cm. outside diameter for collecting the filtered polymer. The pipe has 8 rows of holes spaced 45° apart aligned along the longitudinal length of the pipe. The longitudinal distance between the holes is about 5 cm., and there are 4 holes per row. The pipe has one end closed and is concentrically mounted within the shell with the closed end being adjacent to the shell inlet and the other end passing through the shell outlet and forming a fluid tight seal therewith. For the filtering medium the pipe is first wrapped with 4 layers of 50 mesh screen (0.023 cm. wires), then 15 layers of 325 mesh screen (0.00355 cm. wires), then 4 layers of 50 mesh screen. The outside diameter of the wrapped pipe is now about 4.5 cm.

The polymer passes into the shell through the inlet and fills the annular space between the shell and the centrally mounted wrapped pipe. The booster pump forces the polymer through the screen wrappings and through the holes of the pipe. The filtered polymer next passes through the pipe and out of the shell through the outlet (via the pipe). The filter area is 580 cm.$^2$ and each hour 11.5 kilograms of polymer pass through the filter.

The molten polymer is passed to a header serving eight spinning packs. One of these units contains a pack having a filter consisting of 26 new screens having an effective filtration diameter of 5.08 centimeters (19.7 cm.$^2$). The polymer throughput rate through the test pack is 2.88 lb./hr. (1.31 kg./hr.) or 0.145 lbs./hr. per cm.$^2$ of effective filter surface. The transfer-line filtration rate per cm.$^2$ of filtration area is 0.0436 lbs./hr. per cm.$^2$. The ratio of the pack filter rate per unit area to that of the transfer-line filter rate per unit area is 3.33:1. The seven top screens are 20 mesh, the next 16 screens are 200 mesh and the last 3 screens are 325 mesh. The pack also contains a spinneret with 34 orifices having a diameter of 0.038 centimeters.

The system is evaluated for one week. The pressure at the transfer-line filter outlet remains relatively constant at about 2000 pounds per square inch (141 kilograms per square centimeter) gage. The pressure at the filter inlet increases from 2430 pounds per square inch (171.3 kilograms per square centimeter) gage to 2525 pounds per square inch (178 kilograms per square centimeter) gage over the 7-day test period.

The pressure drop across the pack filter initially is about 875 p.s.i. (61.7 kg./cm.$^2$).

During the first two days following its installation, the pack pressure increases from 1830 to 1890 pounds per square inch (129 to 133.2 kilograms per square centimeter) gage and remains unchanged for the remaining 5 days. When the same test is repeated except that no filter is used in the transfer line, the pressure increases in a regular fashion from 1820 to 2030 pounds per square inch (128.3 to 143.1 kilograms per square centimeter) gage over the 7-day period. In addition to producing more uniform polymer and filaments of the polymer, the process of this invention provides an extended and more uniform pack life.

Since many different embodiments of the invention may be made without departing from the spirit and scope thereof, it is to be understood that the invention is not limited by the specific illustrations except to the extent defined in the following claims.

What is claimed is:

1. In a process for the production of synthetic filaments which comprises polymerizing prepolymer material in a reactor to form molten fiber-forming synthetic linear condensation polymer, maintaining the polymer in a molten state at a temperature above about 175° C., forwarding the polymer through a transfer-line to a positive displacement metering pump, pumping the polymer with the pump at substantially constant rate at a gage pressure within the range of about 1500 to 6000 pounds per square inch through a spinning pack comprising a filter medium and a spinneret to extrude the polymer into a quenching chamber maintained at substantially atmospheric pressure, and then quenching the extruded polymer to form the filaments; the method for improving filament continuity and pack life wherein the improvement comprises increasing the pressure of the polymer in the transfer-line to a pressure of greater than about 1000 pounds per square inch gage with a booster pump located between the reactor and the metering pump, and then filtering the polymer at the increased pressure with a transfer-line filter before reaching the metering pump, said transfer-line filter having a pressure drop within the range of about 200 to about 800 pounds per square inch.

2. The process as in claim 1 wherein the pressure in the transfer-line is increased to a pressure within the range of 1500 to about 3500 pounds per square inch gage.

3. The process as in claim 1 wherein said transfer-line filter has a pressure drop within the range of 225 to 550 pounds per square inch.

4. The process as in claim 1 wherein said polymer is a polyamide.

5. The process as in claim 1 wherein said polymer is a polyester.

6. The process as in claim 1 wherein the pressure drop per unit area of effective filter surface produced by the pack filter medium is from 2 to 25 times as great as the pressure drop per unit area produced by the transfer-line filter.

7. The process as in claim 1 wherein the polymer flow rate per unit area of effective filtration surface for the pack filter medium is from 3 to about 20 times as great as that for the transfer-line filter.

References Cited

UNITED STATES PATENTS

| | | |
|---|---|---|
| 2,589,870 | 3/1952 | Sale et al. |
| 2,343,174 | 2/1944 | Edison et al. |
| 3,028,627 | 4/1962 | McCormick. |

FOREIGN PATENTS

| | | |
|---|---|---|
| 751,853 | 7/1956 | Great Britain. |
| 801,813 | 9/1958 | Great Britain. |

JULIS FROME, Primary Examiner

J. H. WOO, Assistant Examiner

U.S. Cl. X.R.

18—8; 260—75, 78